United States Patent
Sonntag et al.

(10) Patent No.: US 9,545,602 B2
(45) Date of Patent: Jan. 17, 2017

(54) CATALYTIC ARTICLE FOR TREATING EXHAUST GAS

(71) Applicant: Johnson Matthey Public Limited Company, London (GB)

(72) Inventors: Olivier Sonntag, Stuttgart (DE); Tim Genschow, Bad Oeynhausen (DE); Gudmund Smedler, Royston (GB); Andrew Peter Walker, Hazlemere (GB); Mikael Larsson, Gothenburg (SE); Penelope Markatou, Wayne, PA (US); Lingzhi Zhang, Audubon, PA (US); Jane Gast, Spring City, PA (US)

(73) Assignee: Johnson Matthey Public Limited Company, London (GB)

(*) Notice: Subject to any disclaimer, the term of this patent is extended or adjusted under 35 U.S.C. 154(b) by 19 days.

(21) Appl. No.: 14/713,453

(22) Filed: May 15, 2015

(65) Prior Publication Data

US 2016/0008759 A1    Jan. 14, 2016

Related U.S. Application Data

(60) Provisional application No. 61/994,571, filed on May 16, 2014.

(51) Int. Cl.

| | |
|---|---|
| *B01D 53/94* | (2006.01) |
| *B01J 23/72* | (2006.01) |
| *F01N 3/28* | (2006.01) |
| *B01D 53/86* | (2006.01) |
| *B01J 35/00* | (2006.01) |
| *B01J 29/76* | (2006.01) |
| *B01J 29/85* | (2006.01) |
| *B01J 29/072* | (2006.01) |
| *B01J 35/04* | (2006.01) |
| *F01N 3/20* | (2006.01) |

(52) U.S. Cl.
CPC ....... *B01D 53/8628* (2013.01); *B01D 53/9418* (2013.01); *B01D 53/9472* (2013.01); *B01J 29/072* (2013.01); *B01J 29/763* (2013.01); *B01J 29/85* (2013.01); *B01J 35/0006* (2013.01); *B01J 35/04* (2013.01); *B01D 2255/1021* (2013.01); *B01D 2255/20761* (2013.01); *B01D 2255/30* (2013.01); *B01D 2255/50* (2013.01); *B01D 2255/9032* (2013.01); *B01D 2255/9035* (2013.01); *B01D 2255/9037* (2013.01); *B01D 2255/9155* (2013.01); *B01D 2257/404* (2013.01); *B01D 2258/012* (2013.01); *F01N 3/2066* (2013.01); *F01N 2370/04* (2013.01)

(58) Field of Classification Search
CPC ............ B01D 53/9418; B01D 53/9459; B01D 53/9463; B01D 53/9468; B01D 2255/20761; B01D 2255/50; B01D 2255/9022; B01D 2255/9027; B01D 2255/9032; B01D 2255/9037; F01N 3/2066

See application file for complete search history.

(56) References Cited

U.S. PATENT DOCUMENTS

| | | | |
|---|---|---|---|
| 5,024,981 A | 6/1991 | Speronello et al. | |
| 5,516,497 A * | 5/1996 | Speronello | B01D 53/9418 423/235 |
| 8,293,182 B2 | 10/2012 | Boorse et al. | |
| 2010/0111796 A1 | 5/2010 | Caudle et al. | |
| 2011/0020204 A1 | 1/2011 | Bull et al. | |
| 2011/0271664 A1* | 11/2011 | Boorse | B01D 53/9468 60/301 |
| 2014/0037523 A1 | 2/2014 | Ballinger et al. | |
| 2014/0178273 A1* | 6/2014 | Ratts | B01D 53/9404 423/210 |
| 2014/0271422 A1* | 9/2014 | Tang | B01J 23/22 423/212 |
| 2015/0098870 A1 | 4/2015 | Lambert et al. | |
| 2015/0139897 A1* | 5/2015 | Bull | B01D 53/9418 423/700 |

FOREIGN PATENT DOCUMENTS

| | | | |
|---|---|---|---|
| DE | 202008018318 U1 | 1/2013 | |
| DE | 112011101563 T5 | 6/2013 | |
| EP | 0393905 A1 | 10/1990 | |
| WO | WO 2011140251 A * | 11/2011 | ........... H01L 23/552 |

* cited by examiner

*Primary Examiner* — Timothy Vanoy
(74) *Attorney, Agent, or Firm* — Gary D. Mangels

(57) ABSTRACT

Provided is a catalytic article comprising (a) a flow through honeycomb substrate having channel walls; (b) a first $NH_3$-SCR catalyst composition coated on and/or within the channel walls in a first zone; and (c) a second $NH_3$-SCR catalyst composition coated on and/or within the channel walls in a second zone, provided that the first zone is upstream of the second zone and the first and second zones are adjacent or at least partially overlap; and wherein the first $NH_3$-SCR catalyst comprises a first copper loaded molecular sieve having a copper to aluminum atomic ratio of about 0.1 to 0.375 and the second $NH_3$-SCR catalyst comprises a second copper loaded molecular sieve having a copper-to-aluminum atomic ratio of about 0.3 to about 0.6.

20 Claims, 6 Drawing Sheets

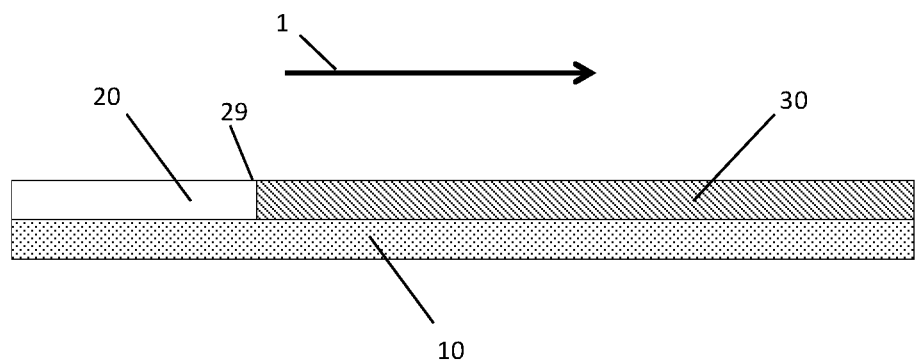
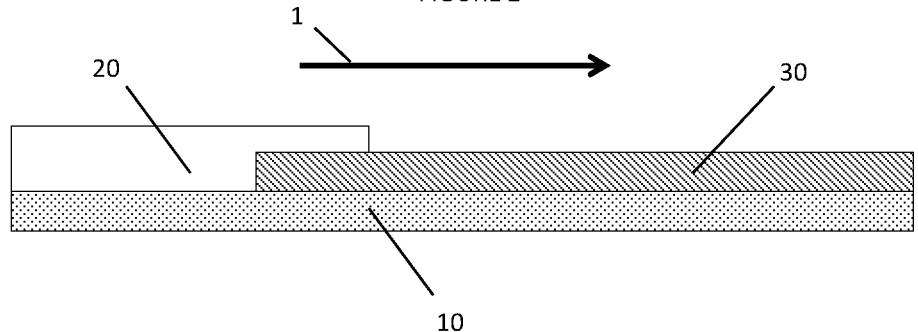
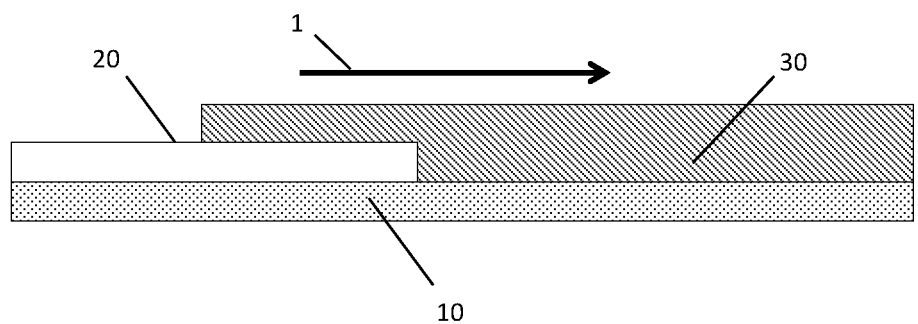

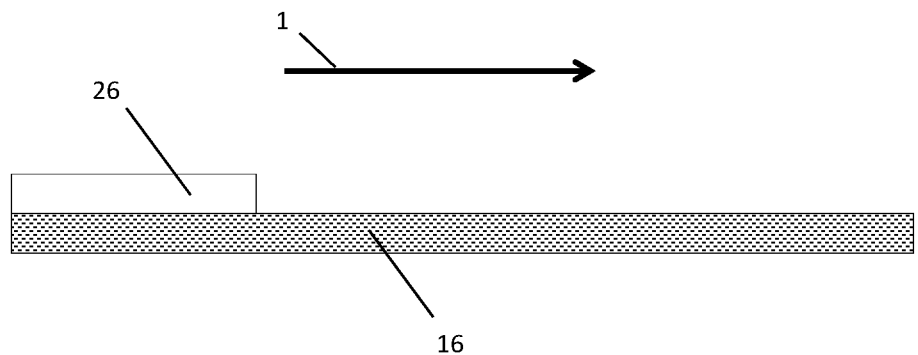
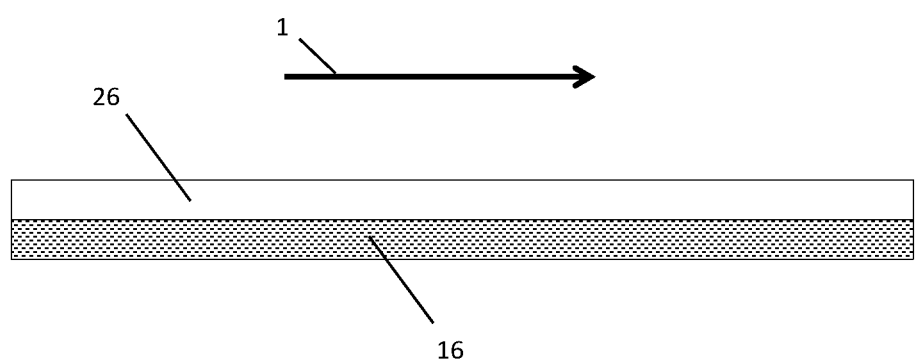
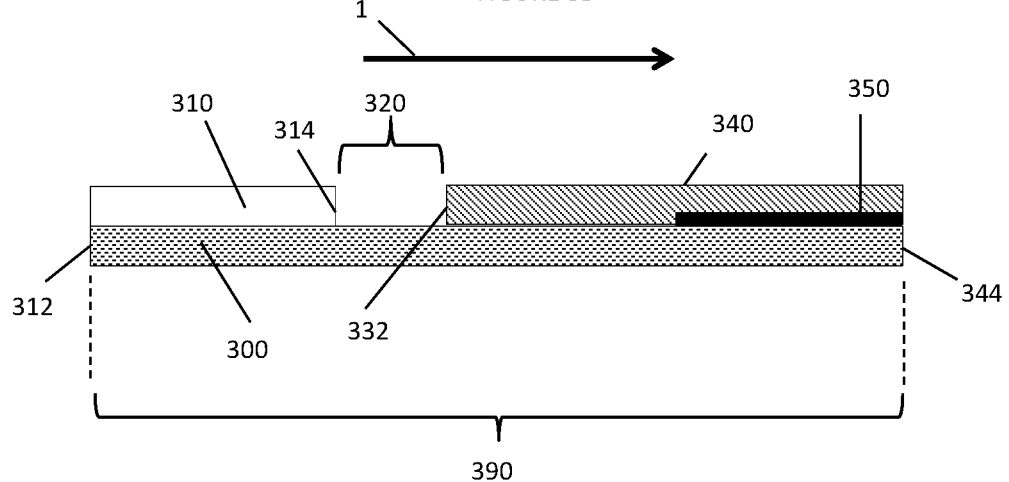

CATALYTIC ARTICLE FOR TREATING EXHAUST GAS

CROSS-REFERENCE TO RELATED APPLICATIONS

This application claims priority to U.S. Provisional Application No. 61/994,571, filed May 16, 2014, which is incorporated herein by reference.

BACKGROUND

Field of Invention

The present invention relates to catalytic articles and methods for treating combustion exhaust gas.

Description of Related Art

Combustion of hydrocarbon-based fuel in engines produces exhaust gas that contains, in large part, relatively benign nitrogen ($N_2$), water vapor ($H_2O$), and carbon dioxide ($CO_2$). But the exhaust gases also contain, in relatively small part, noxious and/or toxic substances, such as carbon monoxide (CO) from incomplete combustion, hydrocarbons (HC) from un-burnt fuel, nitrogen oxides ($NO_x$) from excessive combustion temperatures, and particulate matter (mostly soot). To mitigate the environmental impact of flue and exhaust gas released into the atmosphere, it is desirable to eliminate or reduce the amount of the undesirable components, preferably by a process that, in turn, does not generate other noxious or toxic substances.

Typically, exhaust gases from lean burn gas engines have a net oxidizing effect due to the high proportion of oxygen that is provided to ensure adequate combustion of the hydrocarbon fuel. In such gases, one of the most burdensome components to remove is $NO_x$, which includes nitric oxide (NO), nitrogen dioxide ($NO_2$), and nitrous oxide ($N_2O$). The reduction of $NO_x$ to $N_2$ is particularly problematic because the exhaust gas contains enough oxygen to favor oxidative reactions instead of reduction. Notwithstanding, $NO_x$ can be reduced by a process commonly known as Selective Catalytic Reduction (SCR). An SCR process involves the conversion of $NO_x$, in the presence of a catalyst and with the aid of a reducing agent, such as ammonia, into elemental nitrogen ($N_2$) and water. In an SCR process, a gaseous reductant such as ammonia is added to an exhaust gas stream prior to contacting the exhaust gas with the SCR catalyst. The reductant is absorbed onto the catalyst and the $NO_x$ reduction reaction takes place as the gases pass through or over the catalyzed substrate. The chemical equation for stoichiometric SCR reactions using ammonia is:

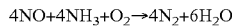

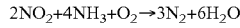

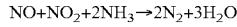

Zeolites having an exchanged transition metal are known to be useful as SCR catalysts. Conventional small pore zeolites exchanged with copper are particularly useful in achieving high $NO_x$ conversion at low temperatures. However, the interaction of $NH_3$ with NO absorbed onto the transition metal of an exchanged zeolite can lead to an undesirable side reaction that produces $N_2O$. This $N_2O$ is particularly problematic to remove from the exhaust stream. Accordingly, there remains a need for improved methods that result in a high conversion of $NO_x$ with minimal $N_2O$ production. The present invention satisfies this need amongst others.

SUMMARY OF THE INVENTION

Applicants have found that a catalytic substrate having at least two catalytic zones, each of which contains a copper loaded molecular sieve, can substantially reduce the undesirable production of $N_2O$ while maintaining overall high $N_2$ selectivity in an SCR reaction, provided that the copper loaded molecular sieve catalyst positioned in an upstream zone has a lower Cu:Al molar ratio compared to the copper loaded molecular sieve in a downstream zone. For example, high $N_2$ selectivity and low $N_2O$ byproduct can be achieved in an SCR process by an exhaust gas through or past substrate having an upstream $NH_3$-SCR catalyst zone comprising a copper loaded molecular sieve having a Cu:Al molar ratio of about 0.1 to 0.375 and a downstream $NH_3$-SCR catalyst zone having a Cu:Al molar ratio of about 0.3 to 0.6. In a preferred embodiment, the upstream molecular sieve has a higher silica-to-alumina (SAR) ratio relative to the downstream molecular sieve. In another preferred embodiment, the upstream molecular sieve catalyst has a lower copper loading relative to the downstream molecular sieve catalyst. In yet another preferred embodiment, the upstream molecular sieve catalyst has a higher SAR and a lower copper loading relative to the downstream molecular sieve catalyst.

Accordingly, in one aspect provided is a catalytic article comprising (a) a flow through honeycomb substrate having an inlet side, an outlet side, an axial length from the inlet side to the outlet side, and a plurality of channels defined by channel walls extending from the inlet side to the outlet side; (b) a first $NH_3$-SCR catalyst composition coated on and/or within the channel walls in a first zone; and (c) a second $NH_3$-SCR catalyst composition coated on and/or within the channel walls in a second zone, provided that the first zone is upstream of the second zone and the first and second zones are in series, and further provided that the first $NH_3$-SCR catalyst comprises a first copper loaded molecular sieve having a copper to aluminum molar ratio of about 0.1 to 0.375 and the second $NH_3$-SCR catalyst comprises a second copper loaded molecular sieve having a copper-to-aluminum molar ratio of about 0.3 to about 0.6.

In another aspect, provided is a catalyst article comprising (a) a flow through honeycomb substrate having an inlet side, an outlet side, an axial length from the inlet side to the outlet side, and a plurality of channels defined by channel walls extending from the inlet side to the outlet side; (b) a first catalytic zone consisting of a first washcoat; (c) a second catalytic zone consisting of the first washcoat and a second washcoat; (d) a third catalytic zone consisting of the second washcoat; and (e) a fourth catalytic zone consisting of the second washcoat over a third washcoat; wherein the first washcoat contains a first copper loaded molecular sieve, the second washcoat contains a second copper loaded molecular sieve wherein the first and second molecular sieves are different materials, and the third washcoat contains an ammonia oxidation catalyst, and wherein the first, second, third, and fourth zones are arranged in series on the substrate, each zone is adjacent to the next zone in the series, the first zone is proximal to the inlet side, and the fourth zone is proximal to the outlet side.

In yet another aspect of the invention, provided is a system for treating an exhaust gas comprising (a) a catalytic article according described herein; and (b) one or more exhaust gas treatment components selected from DOC, NAC, external $NH_3$ injector, secondary SCR catalyst, ASC, and particulate filter, wherein the catalytic article according to claim 1 and the one or more exhaust gas treatment components are in fluid communication and are in series.

In another aspect of the invention, provided is a method for treating an exhaust gas comprising (a) contacting an exhaust gas comprising $NO_x$ and $NH_3$ with a catalytic article according to claim 1; and (b) selectively reducing at least a portion of the $NO_x$ to $N_2$ and $H_2O$.

BRIEF DESCRIPTION OF THE FIGURES

FIG. 1 is a diagram showing an embodiment of the invention with an arrangement of zoned SCR catalysts.

FIG. 2 is a diagram showing an embodiment of the invention with another arrangement of zoned SCR catalysts.

FIG. 3 is a diagram showing an embodiment of the invention with another arrangement of zoned SCR catalysts.

FIG. 8 is a diagram showing an embodiment of the invention with another arrangement of zoned SCR catalysts, wherein one of the zones is in an extruded catalyst body.

FIG. 8A is a diagram showing an embodiment of the invention with another arrangement of zoned SCR catalysts, wherein one of the zones is in an extruded catalyst body.

FIG. 8B is a diagram showing an embodiment of the invention with another arrangement of zoned SCR catalysts, wherein the zones are on an extruded catalyst body.

DETAILED DESCRIPTION OF PREFERRED EMBODIMENTS OF THE INVENTION

Figure 4:
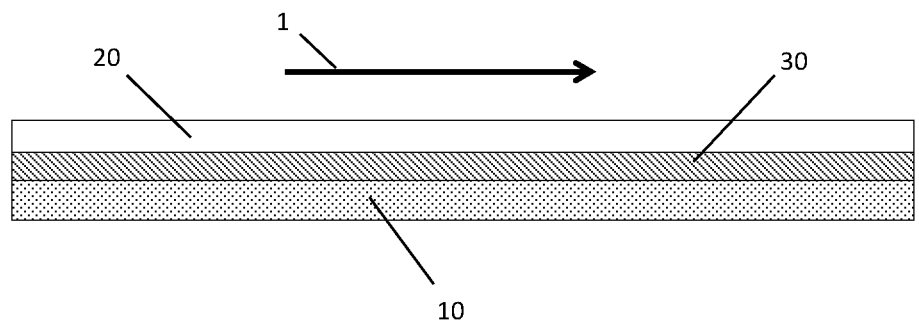
FIG. 4 is a diagram showing an embodiment of the invention with another arrangement of zoned SCR catalysts.

The invention, at least in part, is directed to a method for improving environmental air quality, and in particular for treating exhaust gas emissions generated by power plants, gas turbines, lean burn internal combustion engines, and the like. Exhaust gas emissions are improved, at least in part, by reducing $NO_x$ concentrations over a broad operational temperature range. The conversion of $NO_x$ is accomplished passing the exhaust gas through or over a substrate, preferably a honeycomb flow-through monolith, having two or more $NH_3$-SCR catalysts arranged in zones.

Preferably, a first $NH_3$-SCR catalyst composition is coated on and/or within the channel walls of the flow-through monolith in a first zone, and a second $NH_3$-SCR catalyst composition is coated on and/or within the channel walls of the flow-through monolith in a second zone, the first zone being upstream of the second zone. In certain embodiments, the first or second zone can be in the form of an extruded catalyst body and the other zone is a coating on the body. In certain embodiments, the first zone and the second zone are the same catalyst formulation, provided that the first zone has a lower washcoat loading compared to the second zone. In one example, the first zone can have a washcoat loading that is 85%, 75%, 65%, or 50% of the rear washcoat loading. In certain embodiments, the first and second zones having the same catalyst formulation but different washcoat loadings are separated on different substrates. Preferably, these two substrates are adjacent to one another. In certain embodiments, these substrates are disposed in an exhaust gas treatment system such that no other SCR catalyst, and preferably no other exhaust gas treatment catalyst are positioned between the two substrates.

Turning to FIG. 1, shown is an embodiment of the invention in which a flow-through honeycomb substrate 10 has a first catalyst zone 20 and a second catalyst zone 30, wherein the first and second catalyst zones are consecutive and in contact. The terms "first zone" and "second zone" are indicative of the zone's orientation on the substrate. More specifically, the zones are oriented in series so that under normal operating conditions, the exhaust gas to be treated contacts the first zone prior to contacting the second zone. In one embodiment, the first and second zones are arranged consecutively, so that one follows the other in an uninterrupted succession (i.e., there is no catalyst or other exhaust gas treatment operation such as a filter between the first and second zones). Therefore, in certain embodiments, the first zone is upstream of the second zone with respect to normal exhaust gas flow 1 through or over the substrate.

Differences in the catalyst materials of the first and second zones result in different treatment of the exhaust gas as it passes through or over the substrate. For example, the first zone selectively reduces $NO_x$ while generating lower $N_2O$ byproduct relative to the second zone, and the second zone selectively reduces $NO_x$ at a higher selectivity relative to the first zone. The synergistic effect of the combination of the two zones improves the overall performance of the catalyst compared to single catalyst systems or other zoned arrangements.

Figure 10:
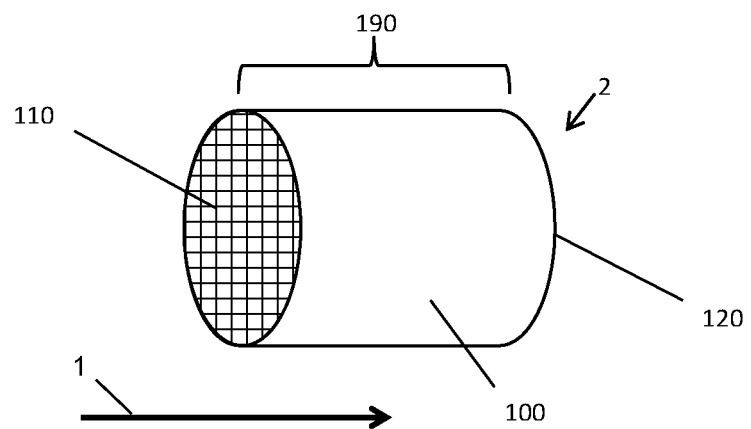
FIG. 10 is a diagram of a flow-through honeycomb substrate comprising zoned SCR catalysts.
Figure 10A:
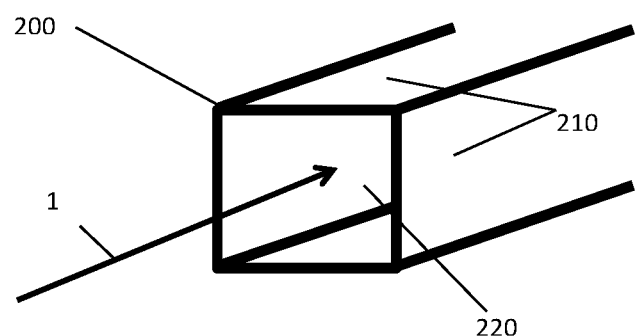
FIG. 10A is a diagram of a cell of a flow-through honeycomb substrate.
Figure 11:
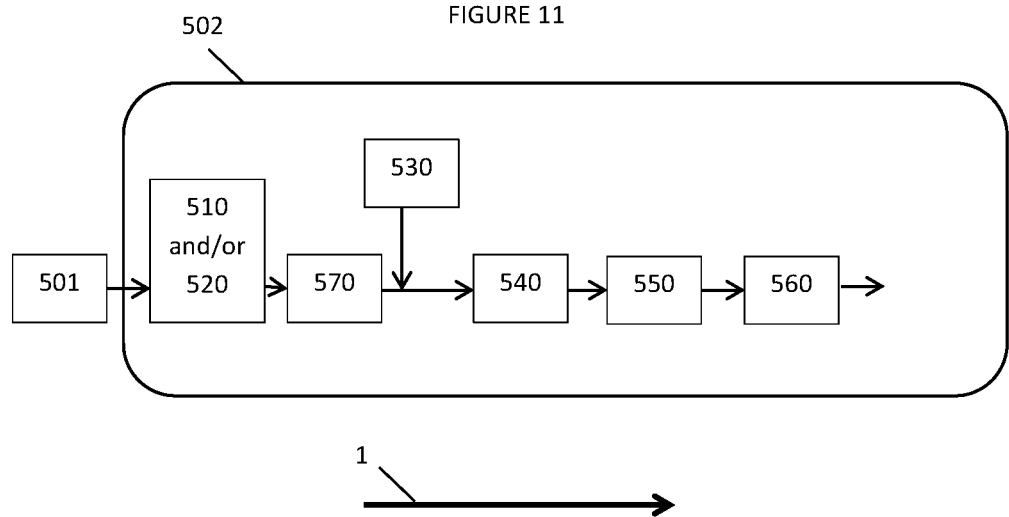
FIG. 11 is a diagram of a system for treating exhaust gas according to an embodiment of the invention.

In FIG. 10, a zoned catalytic substrate 2 is shown wherein the substrate is a honeycomb flow-through monolith 100 having an inlet side 110 and an outlet side 120, relative to the normal direction of exhaust gas flow 1 through the substrate. The substrate has an axial length 190 that extends from the inlet side 110 to the outlet side 120. FIG. 11 shows a single cell 200 of a honeycomb substrate having channel walls 110 that define open channels 120 through which exhaust gas can flow. The channel walls are preferable porous or semi-porous. The catalyst of each zone can be a coating on the surface of the walls, a coating that permeates partially or fully into the walls, incorporated directly into the wall as an extruded body, or some combination thereof.

In FIG. 1, the first zone 20 extends from the inlet side 110 to a first end point 29 that is positioned about 10 to 90 percent, for example about 80-90 percent, about 10 to 25 percent or about 20-30 percent, of the axial length 190. The second zone 120 extends from the outlet side 120 about 20 to 90 percent, for example about 60 to about 80 percent or about 50 to about 75 percent, of the axial length 190. Preferably, the second zone extends to at least the first end point so that the first and second zones are in contact. The axial length is preferably less than 24 inches, such as about 1 to about 24 inches, about 3 to about 12 inches, or about 3 to about 6 inches.

In FIG. 2, the first catalyst zone 20 partially overlaps the second catalyst zone 30. In FIG. 3, the second catalyst zone 30 partially overlaps the first catalyst zone 20. The overlap is preferably less than 90 percent of the axial length of the substrate, for example about 80 to about 90 percent, less than about 40, about 40 to about 60, about 10 to about 15 percent, or about 10 to about 25 percent. For embodiments in which the second catalyst zone overlaps the first catalyst zone, the overlap can be greater than 50 percent of the axial length, such as 80-90 percent. For embodiments in which the first catalyst zone overlaps the second catalyst zone, the overlap is preferably less than 50 percent of the axial length, for example about 10-20 percent.

Figure 4A:
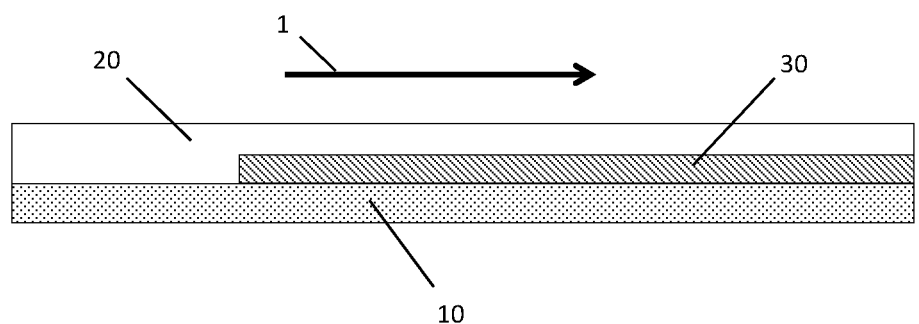
FIG. 4A is a diagram showing an embodiment of the invention with another arrangement of zoned SCR catalysts.

In FIG. 4, the first catalyst zone 20 completely overlaps the second catalyst zone 30. Preferably, the first and second zones are in contact (i.e., there are no intervening catalytically active layers between the first and second zones). For such embodiments, the exhaust gas to be treated first contacts and is at least partially treated by the first zone. At least a portion of the exhaust gas permeates through the first zone where it contacts the second zone where it is subsequently treated. A least a portion of the treated exhaust gas permeates back through the first zone, enters the open channel, and exits the substrate. FIG. 4 shows an embodiment in which the first and second catalyst zones extend the entire axial length of the substrate. FIG. 4A shows an embodiment in which the first catalyst zone completely overlaps the second zone, the first catalyst zone extends the entire axial length of the substrate, and the second zone extends from the outlet side to less than the full axial length of the substrate.

Figure 5:
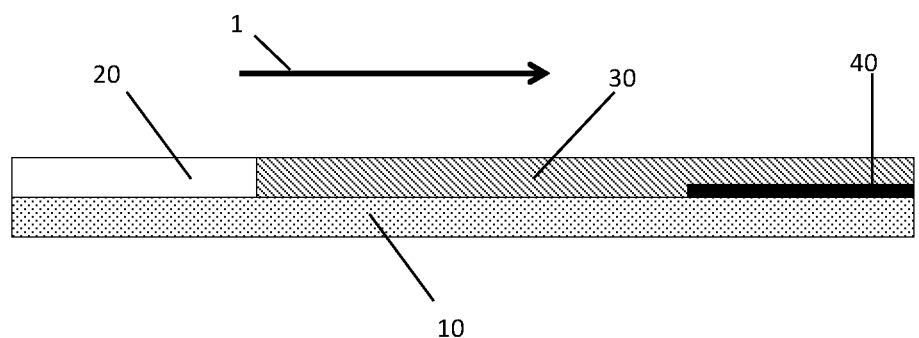
FIG. 5 is a diagram showing an embodiment of the invention with arrangement of zoned SCR catalysts and an ammonia oxidation catalyst.

FIG. 5 shows another embodiment of the invention. Here, the catalytic article further comprises a third catalyst zone proximal to, and preferably extending to, the outlet side of the substrate. The third catalyst zone comprises an oxidation catalyst, preferably a catalyst effective to oxidize ammonia. In certain embodiments, the catalyst comprises one or more platinum group metals (PGM), such as Pt, Pd, or a combination thereof, preferably on a metal oxide support, such as alumina. The combination of the second and third zones in a layered arrangement serves as an ammonia slip catalyst, wherein at least a portion of the excess ammonia not consumed by the upstream SCR reaction passes through the second zone to the third zone where it is oxidized into $H_2O$ and secondary $NO_x$. The $H_2O$ and secondary $NO_x$ pass back through the second zone where at least a portion of the secondary $NO_x$ is reduced to $N_2$ and $H_2O$ via an SCR-type reaction.

Figure 6:
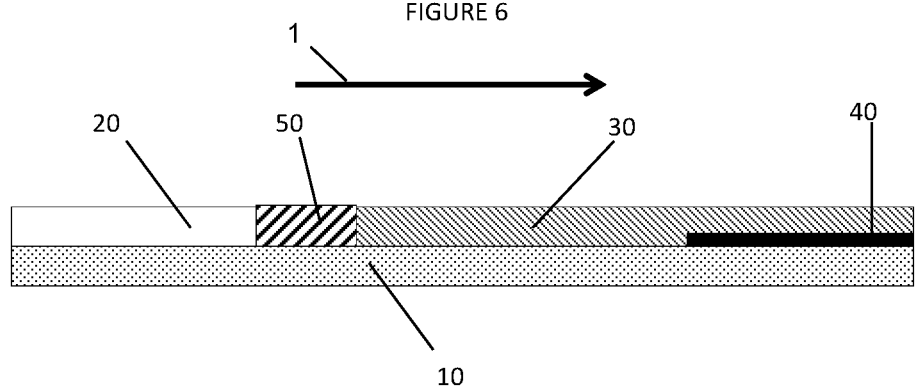
FIG. 6 is a diagram showing an embodiment of the invention with another arrangement of zoned SCR catalysts.

Another embodiment of the invention is shown in FIG. 6 wherein the substrate supports four discrete catalyst zones wherein each comprises a separate catalyst composition. The first, second, and third catalyst zones are similar in composition to those described above. The forth catalyst zone is positioned between the first and second zones so that the first, fourth, and second zones are in series, the first zone contacts the fourth zone, and the fourth zone contacts the second zone. In certain embodiments, the fourth zone can have two or more catalyst layers, wherein each catalyst layer comprises a copper loaded molecular sieve.

The total amount of copper per linear inch in the fourth zone is greater than the total amount of copper per linear inch of the first zones and less than that of the second zone or is greater than the total amount of copper per linear inch of the first and second zones, individually. In certain embodiments, the molecular sieve of the fourth zone is the same as the molecular sieve in the first zone and/or second zone. In certain embodiments, the molecular sieve of the fourth zone comprises two molecular sieve materials. For example, the fourth zone can comprise the molecular sieve of the first zone and the molecular sieve of the second zone, provided that the first and second zones have different molecular sieves.

Figure 7:
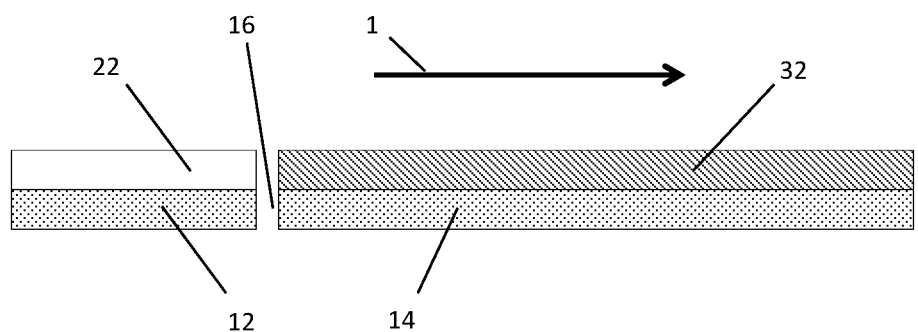
FIG. 7 is a diagram showing an embodiment of the invention with another arrangement of zoned SCR catalysts comprising two substrates.
Figure 7A:
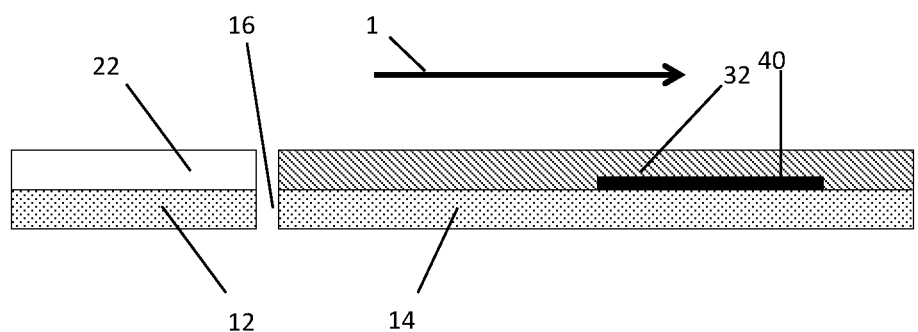
FIG. 7A is a diagram showing an embodiment of the invention with another arrangement of zoned SCR catalysts comprising two substrates and an ASC zone.

Preferably, the first and second zones are consecutively arranged on a single substrate so that the first zone contacts the second zone. In certain embodiments, the first and second zones are arranged on separate substrates which are arranged in an exhaust gas treatment system so that the first and second zones are in series and are in contact. The two substrates can be the same or different substrates. For example, the first substrate can have a higher porosity than the second substrate, the first and second substrates can be different compositions or have a different cell density, and/or the first and second substrates can be different lengths. In FIG. 7, the first and second zones are arranged on separate substrates which are arranged in an exhaust gas treatment system so that the first and second zones are in series and are adjacent, but are not in direct contact. The maximum distance between the first and second substrates is preferably less than 2 inches, more preferably less than 1 inch, and preferably there are no intervening substrates, filters, or catalyst materials between the first and second zones and/or between the first and second substrates. In FIG. 7A, the second substrate further comprises an ammonia oxidation catalyst under-layer 40 that extends from the outlet side of the substrate to a length less than the total length of substrate. The second zone completely covers the oxidative catalyst and preferably extends the length of the substrate.

In certain embodiments, the first or second catalyst zone comprises an extruded catalyst material. The embodiment shown in FIG. 8, for example, comprises a first catalytic zone 26 in the form of a coating on and/or within a portion of an extruded catalyst substrate. The extruded catalyst substrate, in turn, comprises the second catalytic zone 16. The first zone is arranged on the substrate so that it is upstream of the second zone with respect to the normal flow of exhaust gas 1. The catalytically active substrate in zone 16 comprises a catalytically active material similar to that of the other second zones described herein. In FIG. 8, the first zone extends from the inlet side to less than the full length of the substrate. In FIG. 84, the first zone 26 completely covers the catalytically active substrate comprising the second zone.

In FIG. 8B, a catalytically active substrate 300, for example a flow-through honeycomb substrate formed from an extruded catalytic material, is coated with an upstream zone 310 and a downstream zone 330. The upstream zone extends from the inlet side 312 to a first end point 314 that is positioned about 10 to 80 percent, for example about 50-80 percent, about 10 to 25 percent, or about 20-30 percent, of the axial length 390. The downstream zone extends from the outlet side 344 to a second end point 332 that is position about 20 to 80 percent, for example about 20-40 percent, about 60 to about 80 percent, or about 50 to about 75 percent, of the axial length 390. The upstream zone and downstream zone are not in direct contact and thus a gap 320 exists between the upstream zone and the downstream zone. Preferably, this gap does not contain a catalyst layer but instead is directly exposed to the exhaust gas to be treated. The exhaust gas contacts the catalytic body at the gap whereby the exhaust gas is treated, for example to selectively reduce a portion of $NO_x$ in the exhaust gas. The gap, which is defined by the first end point 314 and the second end point 332, is preferably less than 75 percent of the axial length, for example about 40 to about 60, about 10 to about 15 percent, or about 10 to about 25 percent of the axial length 390. An optional $NH_3$ oxidation catalyst is coated on and/or within the substrate 300 in a zone that extends from the outlet side 344 towards the inlet side 312 for a length that is equal to or less than the length of the downstream zone. The optional $NH_3$ oxidation catalyst is preferably an under-layer that is completely covered by the catalyst composition forming the downstream zone.

The compositions of the catalysts in the upstream zone, the extruded body, and the downstream zone are not particularly limited provided that at least two of the upstream zone, the extruded body, and the downstream zone conform to the first and second zone requirements as defined herein, that is the copper-loaded molecular sieve in the first zone has a Cu:Al ratio that is less than the Cu:Al ratio of the copper-loaded molecular sieve in the second zone. In one example, the upstream zone corresponds to the first zone and the downstream zone corresponds to the second. In such embodiments, the extruded catalyst body preferably comprises another type of SCR catalyst, such as vanadium, preferably supported on a metal oxide such as $TiO_2$, and optionally comprising one or more additional metals such as tungsten. In another example, the extruded catalyst body corresponds to the first zone and the downstream zone corresponds to the second zone. In this example, the upstream zone can comprise another type of catalyst, preferably an SCR catalyst such as an iron loaded molecular sieve. In another example, the upstream zone corresponds to the first zone and the extruded body corresponds to the second zone. In this example, this downstream zone can comprise another preferably comprises another type of SCR catalyst such as one of those described herein.

Figure 9:
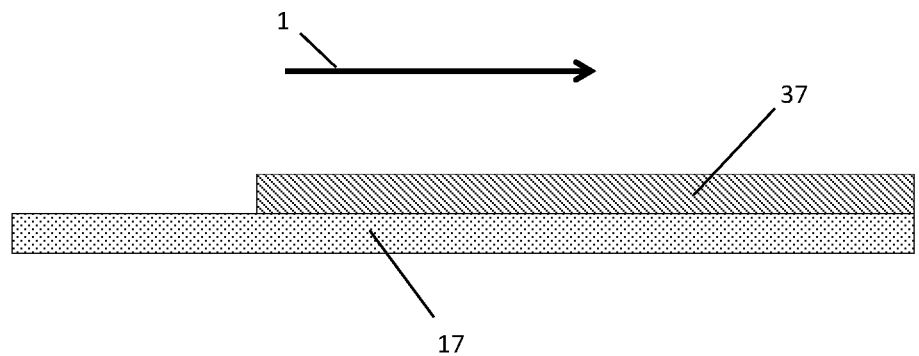
FIG. 9 is a diagram showing an embodiment of the invention with another arrangement of zoned SCR catalysts, wherein one of the zones is in an extruded catalyst body.

FIG. 9 shows another embodiment wherein a first catalytic zone 17 is part of an extruded catalytic body and the second catalyst zone 37 is a coating on and/or within a portion of the extruded catalyst substrate. Again, the first zone is arranged upstream of the second zone with respect to the normal flow of exhaust gas 1 and the catalytically active substrate in zone 17 comprises a catalytically active material similar to that of the other first zones described herein.

The first catalytic zone comprises a first $NH_3$-SCR catalyst composition. The first $NH_3$-SCR catalyst comprises a copper-loaded molecular sieve as a catalytically active component, but may include other components, particularly catalytically inactive components such as binders. As used herein, a "catalytically active" component is one that directly participates in the catalytic reduction of $NO_x$ and/or oxidization of $NH_3$ or other nitrogenous-based SCR reductants. By corollary, a "catalytically inactive" component is one which does not directly participate in the catalytic reduction of $NO_x$ and/or oxidization of $NH_3$ or other nitrogenous-based SCR reductants.

Useful molecular sieves are crystalline or quasi-crystalline materials which can be, for example, aluminosilicates (zeolites) or silicoaluminophosphates (SAPOs). Such molecular sieves are constructed of repeating $SiO_4$, $AlO_4$, and optionally $PO_4$ tetrahedral units linked together, for example in rings, to form frameworks having regular intracrystalline cavities and channels of molecular dimensions. The specific arrangement of tetrahedral units (ring members) gives rise to the molecular sieve's framework, and by convention, each unique framework is assigned a unique three-letter code (e.g., "CHA") by the International Zeolite Association (IZA). Examples of useful molecular sieve frameworks include large pore frameworks (i.e., having a minimum ring size of 12-members), medium pore frameworks (i.e., having a minimum ring size of 10-members), and small-pore frameworks (i.e., having a minimum ring size of 8-members). Examples of frameworks include BEA, MFI, CHA, AEI, LEV, KFI, MER, RHO, ERI, OFF, FER, and AFX. The molecular sieve can also be an intergrowth of two or more frameworks, such as AEI and CHA. In certain embodiments, the first and/or second zones can independently comprise a blend of two or more molecular sieves. Preferred blends have at least one molecular sieve having a CHA framework, and more preferably a majority of the CHA framework.

Particularly useful molecular sieve are small pore zeolites. As used herein, the term "small pore zeolite" means a zeolite framework having a maximum ring size of eight tetrahedral atoms. Preferably, the primary crystalline phase of the molecular sieve is constructed of one or more small pore frameworks, although other molecular sieve crystalline phases may also be present. Preferably, the primary crystalline phase comprises at least about 90 weight percent, more preferably at least about 95 weight percent, and even more preferably at least about 98 or at least about 99 weight percent small pore molecular sieve framework, based on the total amount of molecular sieve material.

In some examples, the small pore zeolite for use in the present invention have a pore size in at least one dimension of less than 4.3 Å. In one embodiment, the small pore zeolite has a framework selected from the group of consisting of: ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG and ZON. Preferred zeolite frameworks are selected from AEI, AFT, AFX, CHA, DDR, ERI, LEV, KFI, RHO, and UEI. For certain applications, preferred zeolite frameworks are selected from AEI, AFT, and AFX, particularly AEI. In certain application, a preferred zeolite framework is CHA. In certain applications, an ERI framework is preferred. Particular zeolites that are useful for the present invention include SSZ-39, Mu-10, SSZ-16, SSZ-13, Sigma-1, ZSM-34, NU-3, ZK-5, and MU-18. Other useful molecular sieves include SAPO-34 and SAPO-18. In a particularly preferred embodiment, the first and second $NH_3$-SCR catalysts independently comprise an aluminosilicate having a CHA framework (e.g., SSZ-13) loaded with copper. In another particularly preferred embodiment, the first $NH_3$-SCR catalyst comprises a copper-loaded SAPO-34 molecular sieve and the second $NH_3$-SCR catalyst comprises a copper-loaded aluminosilicate having a CHA framework.

Preferred aluminosilicates have a silica-to-alumina ratio (SAR) of about 10 to about 50, for example about 15 to about 30, about 10 to about 15, 15 to about 20, about 20 to about 25, about 15 to about 18, or about 20 to about 30. Preferred SAPOs have an SAR of less than 2, for example about 0.1 to about 1.5 or about 0.5 to about 1.0. The SAR of a molecular sieve may be determined by conventional analysis. This ratio is meant to represent, as closely as possible, the ratio in the rigid atomic framework of the molecular sieve crystal and to exclude silicon or aluminum in the binder or in cationic or other form within the channels. Since it may be difficult to directly measure the SAR of the molecular sieve after it has been combined with a binder material, particularly an alumina binder, the SAR value described herein is expressed in terms of the SAR of the molecular sieve per se, i.e., prior to the combination of the zeolite with the other catalyst components.

In certain applications, the SAR of the molecular sieve in the first zone is less than the SAR of the molecular sieve in the second zone. For example, the first zone molecular sieve can be an aluminosilicate having an SAR of about 10 to about 20 and the second zone molecular sieve can be an aluminosilicate having an SAR of about 20 to about 50. In another example, the first zone molecular sieve can be an aluminosilicate having an SAR of about 15 to about 20 and the second zone molecular sieve can be an aluminosilicate having an SAR of about 25 to about 30. In another example, the first zone molecular sieve is a SAPO and the second zone molecular sieve is an aluminosilicate. In other embodiments, the first zone molecular sieve and the second zone molecular sieve have the same SAR, provided that the copper loading on the first zone molecular sieve is higher than the copper loading on the second zone molecular sieve.

The molecular sieve may include framework metals other than aluminum (i.e., metal-substituted zeolites). As used herein, the term "metal substituted" with respect to a molecular sieve means a molecular sieve framework in which one or more aluminum or silicon framework atoms has been replaced by the substituting metal. In contrast, the term "metal exchanged" means a molecular sieve in which one or more ionic species associated with the zeolite (e.g., $H^+$, $NH^{4+}$, $Na^+$, etc.) has been replaced by a metal (e.g., a metal ion or free metal, such as metal oxide), wherein the metal is not incorporated as a molecular sieve framework atom (e.g., T-atom), but instead is incorporated into the molecular pores or on the external surface of the molecular sieve framework. The exchanged metal is a type of "extra-framework metal", that is a metal that resides within the molecular sieve and/or on at least a portion of the molecular sieve surface, preferably as an ionic species, does not include aluminum, and does not include atoms constituting the framework of the molecular sieve. The terms "metal-loaded molecular sieve" means a molecular sieve that includes one or more extra-framework metals. As used herein, the terms "aluminosilicate" and "silicoaluminophosphate" are exclusive of metal-substituted molecular sieves.

The copper-loaded molecular sieves of the present invention comprise copper disposed on and/or within the molecular sieve material as an extra-framework metal. Preferably, the presence and concentration of the copper facilitates the treatment of exhaust gases, such as exhaust gas from a diesel engine, including processes such as $NO_x$ reduction, $NH_3$ oxidation, and $NO_x$ storage, while also suppressing the formation of $N_2O$.

The copper (Cu) is present in an amount relative to the amount of aluminum (Al) in the molecular sieve, namely the framework aluminum. The Cu:Al ratio is based on the relative molar amount of copper to molar framework Al in the molecular sieve. The copper-loaded molecular sieve in the first zone has a copper-to-aluminum molar ratio (Cu:Al ratio) that is less than the Cu:Al ratio of the copper-loaded molecular sieve in the second zone. Applicants have surprisingly found that adjusting the Cu:Al ratio of molecular sieves between the upstream and downstream zones of a flow-through honeycomb substrate provides high $NO_x$ conversion (particularly NO and $NO_2$) and $N_2$ selectivity in an SCR process, while substantially reducing the amount of unwanted $N_2O$ concurrently generated as a byproduct. A difference Cu:Al ratio in the upstream catalytic zone compared to the downstream catalytic zones can be achieve by loading the molecular sieve in the upstream zone with less copper relative to the molecular sieve in the downstream zone, by increasing the SAR of the molecular sieve in the downstream zone relative to the molecular sieve in the upstream zone, or a combination thereof.

Unless otherwise specified, the amount of copper loaded onto a molecular sieve and the copper concentration in the catalyst is referenced in terms of the copper per total weight of the corresponding molecular sieve, and is thus independent of the amount of catalyst washcoat loading on the substrate or the presence of other materials in the catalyst washcoat.

For certain applications, the Cu:Al ratio of the catalyst in the first zone is about 0.1 to about 0.375 and the Cu:Al ratio of the catalyst in the second zone is about 0.3 to about 0.6, provided that the Cu:Al ratio in the first zone catalyst is less than the Cu:Al ratio in the second zone catalyst. In certain embodiment, the first zone comprises copper loaded SAPO and has a Cu:Al ratio of about 0.01 to about 0.1. In certain embodiments the first zone comprises an aluminosilicate and has a Cu:Al ratio of about 0.15 to about 0.375. In certain embodiments, the first zone comprises a SAPO and the second zone comprises an aluminosilicate molecular sieve, wherein the SAPO and aluminosilicate molecular sieve are loaded with a comparable amount of copper. In another embodiment, the molecular sieves of the first and second zones are both aluminosilicates having comparable SARs, provided that the molecular sieve of the first zone is loaded with a lower concentration of copper relative to the molecular sieve of the second zone. In another embodiment, the molecular sieves of the first and second zones are both aluminosilicates wherein the aluminosilicate of the first zone has a lower SAR relative to the molecular sieve of the second zone and the two aluminosilicates have the same copper loading or the first zone molecular sieve has a lower copper loading relative to the second zone molecular sieve.

In certain embodiments, the extra-framework copper is present in the molecular sieve of the first zone or second zone at a concentration of about 0.1 to about 10 weight percent (wt %) based on the total weight of the molecular sieve, for example from about 0.5 wt % to about 5 wt %, from about 0.5 to about 1 wt %, from about 1 to about 5 wt %, about 2.5 wt % to about 3.5 wt %, and about 3 wt % to about 3.5 wt %.

In addition to copper, the molecular sieve can further comprise one or more additional extra-framework metals, provided that the additional extra-framework metal is present in a minority amount (i.e., <50 mol. %, such as about 1 to 30 mol. %, about 1-10 mol. % or about 1-5 mol. %) relative to the copper. The additional extra-framework metal may be any of the recognized catalytically active metals that are used in the catalyst industry to form metal-exchanged molecular sieves, particularly those metals that are known to be catalytically active for treating exhaust gases derived from a combustion process. Particularly preferred are metals useful in $NO_x$ reduction and storage processes. Examples of such metals include metal nickel, zinc, iron, tungsten, molybdenum, cobalt, titanium, zirconium, manganese, chromium, vanadium, niobium, as well as tin, bismuth, and antimony; platinum group metals, such as ruthenium, rhodium, palladium, indium, platinum, and precious metals such as gold and silver. Preferred transition metals are base metals, and preferred base metals include those selected from the group consisting of chromium, manganese, iron, cobalt, nickel, and mixtures thereof.

Preferably, the copper is highly dispersed within the molecular sieve crystals, preferably without a high temperature treatment of the metal loaded molecular sieve. For embodiments which utilize copper, the copper loading is preferably fully ion exchanges and/or is preferably less than can be accommodated by the exchange sites of the molecular sieve support. Preferably, the catalyst is free or substantially free of bulk copper oxide, free or substantially free of species of copper on external molecular sieve crystal surfaces, and/or free or substantially free of copper metal clusters as measured by temperature programmed reduction (TPR) analysis and/or UV-vis analysis.

In one example, a metal-exchanged molecular sieve is created by mixing the molecular sieve, for example an H-form molecular sieve or an $NH_4$-form molecular sieve, into a solution containing soluble precursors of the catalytically active metal(s). The pH of the solution may be adjusted to induce precipitation of the catalytically active metal cations onto or within the molecular sieve structure (but not including the molecular sieve framework. For example, in a preferred embodiment, a molecular sieve material is immersed in a solution containing copper nitrate or copper acetate for a time sufficient to allow incorporation of the catalytically active copper cations into the molecular sieve structure by ion exchange. Un-exchanged copper ions are precipitated out. Depending on the application, a portion of the un-exchanged ions can remain in the molecular sieve material as free copper. The metal-exchanged molecular sieve may then be washed, dried, and calcined. The calcined material may include a certain percentage of copper as copper oxide residing on the surface of the molecular sieve or within the molecular sieve cavities.

Generally, ion exchange of the catalytic metal cation into or on the molecular sieve may be carried out at room temperature or at a temperature up to about 80° C. over a period of about 1 to 24 hours at a pH of about 7. The resulting catalytic molecular sieve material is preferably dried at about 100 to 120° C. overnight and calcined at a temperature of at least about 500° C.

In certain embodiments, the catalyst composition comprises the combination of copper and at least one alkali or alkaline earth metal, wherein the copper and alkali or alkaline earth metal(s) are disposed on or within the molecular sieve material. The alkali or alkaline earth metal can be selected from sodium, potassium, rubidium, cesium, magnesium, calcium, strontium, barium, or some combination thereof. As used here, the phrase "alkali or alkaline earth metal" does not mean the alkali metals and alkaline earth metals are used in the alternative, but instead that one or more alkali metals can be used alone or in combination with one or more alkaline earth metals and that one or more alkaline earth metals can be used alone or in combination with one or more alkali metals. In certain embodiments, alkali metals are preferred. In certain embodiments, alkaline earth metals are preferred. Preferred alkali or alkaline earth metals include calcium, potassium, and combinations thereof.

In certain embodiments, the catalyst composition is essentially free of magnesium and/or barium. In certain embodiments, the catalyst is essentially free of any alkali or alkaline earth metal except calcium and potassium. In certain embodiments, the catalyst is essentially free of any alkali or alkaline earth metal except calcium. And in certain other embodiments, the catalyst is essentially free of any alkali or alkaline earth metal except potassium. As used herein, the term "essentially free" means that the material does not have an appreciable amount of the particular metal. That is, the particular metal is not present in amount that would affect the basic physical and/or chemical properties of the material, particularly with respect to the material's capacity to selectively reduce or store $NO_x$. In certain embodiments, the molecular sieve material has an alkali content of less than 3 weight percent, more preferably less than 1 weight percent, and even more preferably less than 0.1 weight percent.

In certain embodiments, the alkali and/or alkaline earth metal (collectively $A_M$) is present in the molecular sieve material in an amount relative to the amount of copper in the molecular sieve. Preferably, the Cu and $A_M$ are present, respectively, in a molar ratio of about 15:1 to about 1:1, for example about 10:1 to about 2:1, about 10:1 to about 3:1, or about 6:1 to about 4:1, particularly were $A_M$ is calcium. In certain embodiments which include an alkali and/or alkaline earth metal such as calcium, the amount of copper present is less than 2.5 weight percent, for example less than 2 weight percent or less than 1 weight percent, based on the weight of the molecular sieve. In certain embodiments, the copper loaded molecular sieve of the second zone contains an alkali or alkaline earth metal, particularly calcium, and the copper loaded molecular sieve of the first zone is essentially free of an alkali or alkaline earth metal. For such embodiments, the relative cumulative amount of copper and alkali and/or alkaline earth metal ($A_M$) present in the molecular sieve material of the second zone is relative to the amount of aluminum in the molecular sieve, namely the framework aluminum. As used herein, the (Cu+$A_M$):Al ratio is based on the relative molar amounts of Cu+$A_M$ to molar framework Al in the corresponding molecular sieve. In certain embodiments, the molecular sieve of the second zone has a (Cu+$A_M$):Al ratio of not more than about 0.6, particularly where $A_M$ is calcium. In certain embodiments, the (Cu+$A_M$):Al ratio is at least 0.3, for example about 0.3 to about 0.6. In such embodiments, the Cu:Al ratio of the catalyst in the first zone is about 0.1 to about 0.375, provided that the Cu:Al ratio in the first zone catalyst is less than the (Cu+$A_M$):Al ratio in the second zone catalyst.

In certain embodiments, the relative cumulative amount of copper and alkali and/or alkaline earth metal ($A_M$) is present in the molecular sieve material of the second zone in an amount relative to the amount of aluminum in the molecular sieve, namely the framework aluminum. As used herein, the (Cu+$A_M$):Al ratio is based on the relative molar amounts of Cu+$A_M$ to molar framework Al in the corresponding molecular sieve. In certain embodiments, the catalyst material has a (Cu+$A_M$):Al ratio of not more than about 0.6. In certain embodiments, the (Cu+$A_M$):Al ratio is not more than 0.5, for example about 0.05 to about 0.5, about 0.1 to about 0.4, or about 0.1 to about 0.2.

The alkali/alkaline earth metal can be added to the molecular sieve via any known technique such as ion exchange, impregnation, isomorphous substitution, etc. The copper and the alkali or alkaline earth metal can be added to the molecular sieve material in any order (e.g., the metal can be exchanged before, after, or concurrently with the alkali or alkaline earth metal), but preferably the alkali or alkaline earth metal is added prior to or concurrently with the copper.

The catalytic articles of the present invention are applicable for heterogeneous catalytic reaction systems (i.e., solid catalyst in contact with a gas reactant). To improve contact surface area, mechanical stability, and/or fluid flow characteristics, the SCR catalysts are disposed on and/or within a substrate such as honeycomb cordierite brick. In certain embodiments, one or more of the catalyst compositions is applied to the substrate as a washcoat(s). Alternatively, one or more of the catalyst compositions is kneaded along with other components such as fillers, binders, and reinforcing agents, into an extrudable paste which is then extruded through a die to form a honeycomb brick.

Certain aspects of the invention provide a catalytic washcoat. The washcoat comprising a copper-loaded molecular sieve catalyst described herein is preferably a solution, suspension, or slurry. Suitable coatings include surface coatings, coatings that penetrate a portion of the substrate, coatings that permeate the substrate, or some combination thereof.

A washcoat can also include non-catalytic components, such as fillers, binders, stabilizers, rheology modifiers, and other additives, including one or more of alumina, silica, non-molecular sieve silica alumina, titania, zirconia, ceria. In certain embodiments, the catalyst composition may comprise pore-forming agents such as graphite, cellulose, starch, polyacrylate, and polyethylene, and the like. These additional components do not necessarily catalyze the desired reaction, but instead improve the catalytic material's effectiveness, for example, by increasing its operating temperature range, increasing contact surface area of the catalyst, increasing adherence of the catalyst to a substrate, etc. In preferred embodiments, the washcoat loading is >0.3 g/in$^3$, such as >1.2 g/in$^3$, >1.5 g/in$^3$, >1.7 g/in$^3$ or >2.00 g/in$^3$, and preferably <3.5 g/in$^3$, such as <2.5 g/in$^3$. In certain embodiments, the washcoat is applied to a substrate in a loading of about 0.8 to 1.0 g/in$^3$, 1.0 to 1.5 g/in$^3$, 1.5 to 2.5 g/in$^3$, or 2.5 to 3.5 g/in$^3$.

Preferred substrates, particularly for mobile applications, include flow-through monoliths having a so-called honeycomb geometry that comprise multiple adjacent, parallel channels that are open on both ends and generally extend from the inlet face to the outlet face of the substrate and result in a high-surface area-to-volume ratio. For certain applications, the honeycomb flow-through monolith preferably has a high cell density, for example about 600 to 800 cells per square inch, and/or an average internal wall thickness of about 0.18-0.35 mm, preferably about 0.20-0.25 mm. For certain other applications, the honeycomb flow-through monolith preferably has a low cell density of about 150-600 cells per square inch, more preferably about 200-400 cells per square inch. Preferably, the honeycomb monoliths are porous. In addition to cordierite, silicon carbide, silicon nitride, ceramic, and metal, other materials that can be used for the substrate include aluminum nitride, silicon nitride, aluminum titanate, α-alumina, mullite, e.g., acicular mullite, pollucite, a thermet such as Al$_2$OsZFe, Al$_2$O$_3$/Ni or B$_4$CZFe, or composites comprising segments of any two or more thereof. Preferred materials include cordierite, silicon carbide, and alumina titanate.

In certain embodiments, the invention is a catalyst article made by a process described herein. In a particular embodiment, the catalyst article is produced by a process that includes the steps of applying the first NH$_3$-SCR catalyst composition, preferably as a washcoat, to a substrate as a layer either before or after the second NH$_3$-SCR catalyst composition, preferably as a washcoat, has been applied to the substrate.

In certain embodiments, the second NH$_3$-SCR catalyst composition is disposed on the substrate as a top layer and another composition, such as an oxidation catalyst, reduction catalyst, scavenging component, or NO$_x$ storage component, is disposed on the substrate as a bottom layer.

In general, the production of an extruded solid body containing the first or second NH$_3$-SCR catalyst composition involves blending the molecular sieve and the copper (either separately or together as a metal-exchanged molecular sieve), a binder, an optional organic viscosity-enhancing compound into a homogeneous paste which is then added to a binder/matrix component or a precursor thereof and optionally one or more of stabilized ceria, and inorganic fibers. The blend is compacted in a mixing or kneading apparatus or an extruder. The mixtures have organic additives such as binders, pore formers, plasticizers, surfactants, lubricants, dispersants as processing aids to enhance wetting and therefore produce a uniform batch. The resulting plastic material is then molded, in particular using an extrusion press or an extruder including an extrusion die, and the resulting moldings are dried and calcined. The organic additives are "burnt out" during calcinations of the extruded solid body. A metal-promoted zeolite catalyst may also be washcoated or otherwise applied to the extruded solid body as one or more sub-layers that reside on the surface or penetrate wholly or partly into the extruded solid body. Alternatively, a metal-promoted zeolite can be added to the paste prior to extrusion. Preferably, the copper-loaded molecular sieve is dispersed throughout, and preferably evenly throughout, the entire extruded catalyst body.

Extruded solid bodies containing metal-promoted zeolites according to the present invention generally comprise a unitary structure in the form of a honeycomb having uniform-sized and parallel channels extending from a first end to a second end thereof. Channel walls defining the channels are porous. Typically, an external "skin" surrounds a plurality of the channels of the extruded solid body. The extruded solid body can be formed from any desired cross section, such as circular, square or oval. Individual channels in the plurality of channels can be square, triangular, hexagonal, circular etc.

The catalytic article described herein can promote the reaction of a nitrogenous reductant, preferably ammonia, with nitrogen oxides to selectively form elemental nitrogen (N$_2$) and water (H$_2$O). Examples of such nitrogenous reductants include ammonia and ammonia hydrazine or any suitable ammonia precursor, such as urea ((NH$_2$)$_2$CO), ammonium carbonate, ammonium carbamate, ammonium hydrogen carbonate or ammonium formate. The SCR process of the present method can result in a NO$_x$ (NO and/or NO$_2$) conversion of at least 75%, preferably at least 80%, and more preferably at least 90% over a broad temperature range (e.g., about 150-700° C., about 200-350° C., about 350-550° C., or about 450-550° C.).

Importantly, the use of zoned catalysts according to the present invention generates low amounts of N$_2$O byproduct compared to conventional SCR catalysts. That is, the SCR process of the present method can result in low N$_2$O generation based on NO and/or NO$_2$ at the SCR inlet. For example, the relative ratio of inlet NO concentration at the SCR catalyst compared to outlet N$_2$O concentration after the SCR catalyst is greater than about 25, greater than about 30 (for example about 30 to about 40), greater than about 50, greater than about 80, or greater than about 100 over a broad temperature range (e.g., about 150-700° C., about 200-350° C., about 350-550° C., or about 450-550° C.). In another example, the relative ratio of inlet NO$_2$ concentration at the SCR catalyst compared to outlet N$_2$O concentration after the SCR catalyst is greater than about 50, greater than about 80, or greater than about 100 over a broad temperature range (e.g., about 150-700° C., about 200-350° C., about 350-550° C., or about 450-550° C.).

The copper-loaded molecular sieve catalyst described herein coupled with an oxidation catalyst can also promote the oxidation of ammonia and limit the undesirable formation of NO$_x$ by the oxidation process (i.e., an ammonia slip catalyst (ASC)). In certain embodiments, the catalytic article of the present invention contains an ASC zone at the outlet end of the substrate. In other embodiments, an ammonia slip catalyst disposed on a separate brick downstream of the zoned SCR catalysts. These separate bricks can be adjacent to, and in contact with, each other or separated by a specific distance, provided that they are in fluid communication with each other and provided that the SCR catalyst brick is disposed upstream of the ammonia slip catalyst brick.

In certain embodiments, the SCR and/or ASC process is performed at a temperature of at least 100° C. In another embodiment, the process(es) occur at a temperature from about 150° C. to about 750° C. In a particular embodiment, the temperature range is from about 175 to about 550° C. In another embodiment, the temperature range is from 175 to 400° C. In yet another embodiment, the temperature range is 450 to 900° C., preferably 500 to 750° C., 500 to 650° C., 450 to 550° C., or 650 to 850° C.

According to another aspect of the invention, provided is a method for the reduction of $NO_x$ compounds and/or oxidation of $NH_3$ in a gas, which comprises contacting the gas with a catalyst described herein for a time sufficient to reduce the level of $NO_x$ compounds in the gas. Methods of the present invention may comprise one or more of the following steps: (a) accumulating and/or combusting soot that is in contact with the inlet of a filter; (b) introducing a nitrogenous reducing agent into the exhaust gas stream prior to contacting the SCR catalyst, preferably with no intervening catalytic steps involving the treatment of $NO_x$ and the reductant; (c) generating $NH_3$ over a $NO_x$ adsorber catalyst or lean $NO_x$ trap, and preferably using such $NH_3$ as a reductant in a downstream SCR reaction; (d) contacting the exhaust gas stream with a DOC to oxidize hydrocarbon based soluble organic fraction (SOF) and/or carbon monoxide into $CO_2$, and/or oxidize NO into $NO_2$, which in turn, may be used to oxidize particulate matter in particulate filter; and/or reduce the particulate matter (PM) in the exhaust gas; (e) contacting the exhaust gas with one or more downstream SCR catalyst device(s) (filter or flow-through substrate) in the presence of a reducing agent to reduce the NOx concentration in the exhaust gas; and (f) contacting the exhaust gas with an ammonia slip catalyst, preferably downstream of the SCR catalyst to oxidize most, if not all, of the ammonia prior to emitting the exhaust gas into the atmosphere or passing the exhaust gas through a recirculation loop prior to exhaust gas entering/re-entering the engine.

In a preferred embodiment, all or at least a portion of the nitrogen-based reductant, particularly $NH_3$, for consumption in the SCR process can be supplied by a $NO_x$ adsorber catalyst (NAC), a lean $NO_x$ trap (LNT), or a $NO_x$ storage/reduction catalyst (NSRC), (collectively NAC) disposed upstream of the SCR catalyst. In certain embodiments, the NAC is coated on the same flow-through substrate as the zoned SCR catalyst. In such embodiments, the NAC and SCR catalysts are coated in series with the NAC being upstream of the SCR zones.

NAC components useful in the present invention include a catalyst combination of a basic material (such as alkali metal, alkaline earth metal or a rare earth metal, including oxides of alkali metals, oxides of alkaline earth metals, and combinations thereof), and a precious metal (such as platinum), and optionally a reduction catalyst component, such as rhodium. Specific types of basic material useful in the NAC include cesium oxide, potassium oxide, magnesium oxide, sodium oxide, calcium oxide, strontium oxide, barium oxide, and combinations thereof. The precious metal is preferably present at about 10 to about 200 g/ft$^3$, such as 20 to 60 g/ft$^3$. Alternatively, the precious metal of the catalyst is characterized by the average concentration which may be from about 40 to about 100 grams/ft$^3$.

Under certain conditions, during the periodically rich regeneration events, $NH_3$ may be generated over a $NO_x$ adsorber catalyst. The SCR catalyst downstream of the $NO_x$ adsorber catalyst may improve the overall system $NO_x$ reduction efficiency. In the combined system, the SCR catalyst is capable of storing the released $NH_3$ from the NAC catalyst during rich regeneration events and utilizes the stored $NH_3$ to selectively reduce some or all of the $NO_x$ that slips through the NAC catalyst during the normal lean operation conditions.

In certain aspects, the invention is a system for treating exhaust gas generated by combustion process, such as from an internal combustion engine (whether mobile or stationary), a gas turbine, coal or oil fired power plants, and the like. Such systems include a zoned SCR catalytic article described herein and at least one additional component for treating the exhaust gas, wherein the zoned SCR catalytic article and at least one additional component are designed to function as a coherent unit. The zoned SCR catalytic article and at least one additional component are in fluid communication, optionally by one or more sections of conduit for channeling exhaust gas through the system.

The exhaust gas treatment system can comprise an oxidation catalyst (e.g., a diesel oxidation catalyst (DOC)) for oxidizing nitrogen monoxide in the exhaust gas to nitrogen dioxide can be located upstream of a point of metering the nitrogenous reductant into the exhaust gas. In one embodiment, the oxidation catalyst is adapted to yield a gas stream entering the SCR zeolite catalyst having a ratio of NO to $NO_2$ of from about 4:1 to about 1:3 by volume, e.g. at an exhaust gas temperature at oxidation catalyst inlet of 250° C. to 450° C. The oxidation catalyst can include at least one platinum group metal (or some combination of these), such as platinum, palladium, or rhodium, coated on a flow-through monolith substrate. In one embodiment, the at least one platinum group metal is platinum, palladium or a combination of both platinum and palladium. The platinum group metal can be supported on a high surface area washcoat component such as alumina, a zeolite such as an aluminosilicate zeolite, silica, non-zeolite silica alumina, ceria, zirconia, titania or a mixed or composite oxide containing both ceria and zirconia.

The exhaust gas treatment system can comprise an additional SCR catalyst on a second flow-through monolith or a wall-flow filter, wherein the second flow-through monolith or wall-flow filter containing the additional SCR is positioned upstream or downstream of, and in fluid communication with, the zoned SCR catalytic article described herein. The additional SCR catalyst is preferably a metal-exchanged zeolite, such as Cu-Beta, Cu-ZSM5, Cu-CHA, Cu-ZSM-34, or Cu-AEI.

The exhaust gas treatment system can comprise an NAC and/or an external source of nitrogenous reductant (e.g., an ammonia or urea injector) disposed upstream of the catalytic article. The system can include a controller for the metering the external nitrogenous reductant into the flowing exhaust gas only when it is determined that the SCR catalyst zones are capable of catalyzing $NO_x$ reduction at or above a desired efficiency, such as at above 100° C., above 150° C. or above 175° C. The metering of the nitrogenous reductant can be arranged such that 60% to 200% of theoretical ammonia is present in exhaust gas entering the SCR catalyst calculated at 1:1 $NH_3$/NO and 4:3 $NH_3$/$NO_2$.

The exhaust gas treatment system can comprise a suitable particulate filter, such as a wall-flow filter. Suitable filters include those useful in removing soot from an exhaust gas stream. The filter can be bare and passively regenerated, or can contain a soot combustion catalyst or a hydrolysis catalyst. The filter can also comprise an SCR catalyst loaded on the inlet side of the filter walls, the outlet side of the filter walls, partially or fully permeate the filter walls, or some combination thereof. In certain embodiments, the filter is the substrate for the first or second catalyst zone as described herein, provided that the alternate zone is disposed on a flow-through substrate. For example, a wall flow filter can be used as a substrate for the first zone and a flow-through honeycomb can be used as the substrate for the second zone. In another example, a flow-through honeycomb can be used as the substrate for the first zone and a wall-flow filter can be used as the substrate for the second zone. In such embodiments, the wall flow substrate may further comprise an $NH_3$ oxidation catalyst to form an ASC zone.

The filter can be positioned in the exhaust gas treatment system either upstream or downstream of the zoned SCR catalyst. Preferably, the filter is positioned downstream of the DOC if a DOC is present. For embodiments comprising a bare filter (i.e. having no catalyst coating) and an ammonia injector upstream of the zoned SCR catalyst, the injector can be positioned upstream or downstream of the filter provided that it is positioned upstream of the zoned SCR catalyst. For embodiments having a filter containing a hydrolysis catalyst and downstream positioned zoned SCR catalyst, an ammonia injector is preferable positioned upstream of the filter.

Turning to FIG. 11, shown is an exhaust gas treatment system comprising an internal combustion engine 501, an exhaust gas treatment system 502, a direction of exhaust gas flow through the system 1, an optional DOC 510 and/or an optional NAC 520, an optional particulate filter 570, an optional external source of ammonia and injector 530, a zoned SCR catalyst 540, an optional additional SCR catalyst 550, and an optional ASC 560.

The method for treating exhaust gas as described herein can be performed on an exhaust gas derived from a combustion process, such as from an internal combustion engine (whether mobile or stationary), a gas turbine and coal or oil fired power plants. The method may also be used to treat gas from industrial processes such as refining, from refinery heaters and boilers, furnaces, the chemical processing industry, coke ovens, municipal waste plants and incinerators, etc. In a particular embodiment, the method is used for treating exhaust gas from a vehicular lean burn internal combustion engine, such as a diesel engine, a lean-burn gasoline engine or an engine powered by liquid petroleum gas or natural gas.

What is claimed is:
1. A catalytic article comprising:
    a. a flow through honeycomb substrate having an inlet side, an outlet side, an axial length from the inlet side to the outlet side, and a plurality of channels defined by channel walls extending from the inlet side to the outlet side;
    b. a first $NH_3$-SCR catalyst composition coated on and/or within the channel walls in a first zone; and
    c. a second $NH_3$-SCR catalyst composition coated on and/or within the channel walls in a second zone, provided that the first zone is upstream of the second zone and the first and second zones are adjacent or at least partially overlap;
        wherein the first $NH_3$-SCR catalyst comprises a first copper loaded molecular sieve having a copper to aluminum atomic ratio of about 0.1 to 0.375 and the second $NH_3$-SCR catalyst comprises a second copper loaded molecular sieve having a copper-to-aluminum atomic ratio of about 0.3 to about 0.6.
2. The catalytic article of claim 1, wherein the first zone is adjacent to the second zone.

3. The catalytic article of claim 1, wherein the first zone completely overlays the second zone.

4. The catalytic article of claim 1, wherein first zone extends from the inlet side to a first end point that is position about 10 to 40 percent of the axial length and wherein the second zone is about 20 to 90 percent of the axial length, provided that the first and second zones are adjacent or overlap by less than 90 percent of the axial length.

5. The catalytic article of claim 4, wherein the first zone overlaps the second zone.

6. The catalytic article of claim 4, wherein the second zone overlaps the first zone.

7. The catalytic article of claim 1, wherein the first copper loaded molecular sieve has a lower copper concentration relative to the second copper loaded molecular sieve.

8. The catalyst article of claim 2, wherein the first copper loaded molecular sieve has a copper loading of about 50 to 90 percent of second copper loaded molecular sieve.

9. The catalytic article of claim 1, wherein the first copper loaded molecular sieve has a first SAR and the second copper loaded molecular sieve has a second SAR which is larger than the first SAR.

10. The catalyst article of claim 9, wherein the first molecular sieve is an aluminosilicate having a SAR of about 10 to about 20 and the second molecular sieve is an aluminosilicate having a SAR of about 20 to about 50.

11. The catalyst article of claim 9, wherein the first and second molecular sieves have a small pore framework.

12. The catalyst article of claim 9, wherein the first and second molecular sieves have a CHA framework.

13. The catalyst article of claim 9, wherein the first molecular sieve is a silicoaluminophosphate and the second molecular sieve is an aluminosilicate having a SAR of about 15 to about 50.

14. The catalyst article of claim 4, wherein the first and second zones overlap to create a third catalyst zone, wherein the third zone having a higher amount of copper compared to the first and second zones, individually.

15. The catalyst article of claim 1, further comprising an ASC zone having an ammonia oxidation catalyst coated on and/or within the channel walls, wherein the ASC zone extends from the outlet side for a distance that is about 10 to 50 percent of the axial length and does not contact the first zone.

16. The catalyst article of claim 15, wherein the second $NH_3$-SCR catalyst composition fully overlaps the oxidation catalyst.

17. The catalyst article of claim 16, wherein the oxidation catalyst comprises platinum.

18. A catalyst article comprising:
    a. a flow through honeycomb substrate having an inlet side, an outlet side, an axial length from the inlet side to the outlet side, and a plurality of channels defined by channel walls extending from the inlet side to the outlet side,
    b. a first catalytic zone consisting of a first washcoat,
    c. a second catalytic zone consisting of the first washcoat and a second washcoat,
    d. a third catalytic zone consisting of the second washcoat, and
    e. a fourth catalytic zone consisting of the second washcoat over a third washcoat,
        wherein the first washcoat contains a first copper loaded molecular sieve, the second washcoat contains a second copper loaded molecular sieve wherein the first and second molecular sieves are different materials, and the third washcoat contains an ammonia oxidation catalyst, and wherein the first, second, third, and fourth zones are arranged in series on the substrate, each zone is adjacent to the next zone in the series, the first zone is proximal to the inlet side, and the fourth zone is proximal to the outlet side.

19. A system for treating an exhaust gas comprising:
a. a catalytic article according to claim 1; and
b. one or more exhaust gas treatment components selected from DOC, NAC, external $NH_3$ injector, secondary SCR catalyst, ASC, and particulate filter,
wherein the catalytic article according to claim 1 and the one or more exhaust gas treatment components are in fluid communication and are in series.

20. A method for treating an exhaust gas comprising:
contacting an exhaust gas comprising $NO_x$ and $NH_3$ with a catalytic article according to claim 1;
selectively reducing at least a portion of the $NO_x$ to $N_2$ and $H_2O$.

* * * * *